Figure 1:
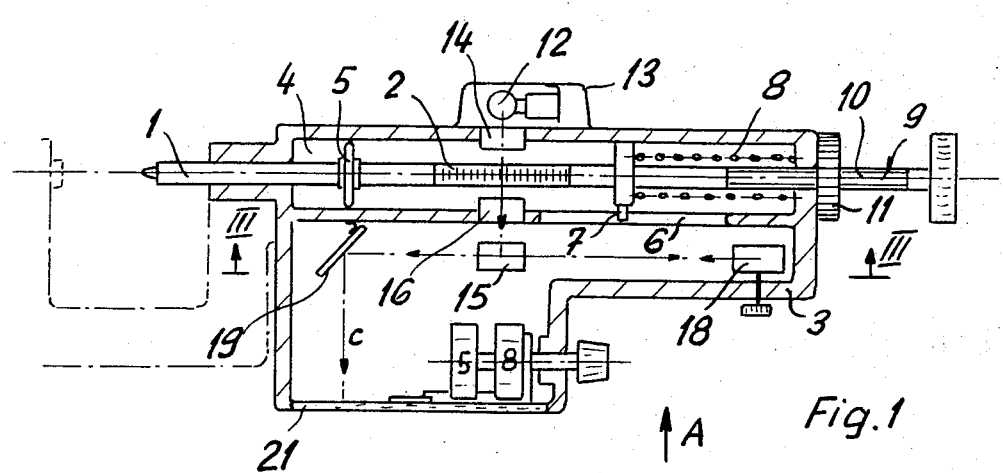

United States Patent [19]
Meier

[11] 3,826,009
[45] July 30, 1974

[54] LENGTH GAUGING APPARATUS

[76] Inventor: Johann Meier, Casa Clarissa CH-6645, Brione Spora Minusio, Switzerland

[22] Filed: Dec. 30, 1971

[21] Appl. No.: 214,255

[30] Foreign Application Priority Data
Jan. 28, 1971  Switzerland.......................... 1295/71

[52] U.S. Cl............................................. 33/169 R
[51] Int. Cl. .......................................... G01b 5/20
[58] Field of Search ............ 33/143, 147, 166, 172, 33/125 R, 125 A, 178

[56] References Cited
UNITED STATES PATENTS

| 672,622 | 4/1901 | Isherwood............................ 33/165 |
| 783,721 | 2/1905 | Clapp................................... 33/165 |
| 1,943,638 | 1/1934 | Swanson .............................. 33/165 |
| 2,527,173 | 10/1950 | Boat................................... 33/172 A |
| 2,663,943 | 12/1953 | Haidegger............................. 33/166 |
| 2,852,976 | 9/1958 | Hoffmann.......................... 33/125 A |
| 2,996,806 | 8/1961 | Zieher................................. 33/143 R |
| 3,031,923 | 5/1962 | Herdenhain ....................... 33/166 X |
| 3,124,880 | 3/1904 | Rantsch ............................. 33/125 A |
| 3,183,597 | 5/1965 | Donaldson et al. ............... 33/169 R |
| 3,196,546 | 7/1965 | Himmelsbach et al........... 33/143 F |
| 3,354,553 | 11/1967 | Heldmaier......................... 33/178 E |
| 3,576,077 | 4/1971 | Moreman.......................... 33/178 R |

FOREIGN PATENTS OR APPLICATIONS

| 232,647 | 9/1944 | Switzerland ...................... 33/147 F |
| 164,575 | 12/1933 | Switzerland ...................... 33/147 F |

*Primary Examiner*—Harry N. Haroian
*Attorney, Agent, or Firm*—Pierce, Scheffler & Parker

[57] ABSTRACT

The invention relates to a length gauging apparatus of the type in which a gauge pin is displaceable in its longitudinal direction and has a scale or grid connected to it, and involve the concept of pneumatically cushioning the gauge pin to prevent an unwanted displacement speed when displaced in the direction of measurement.

6 Claims, 9 Drawing Figures

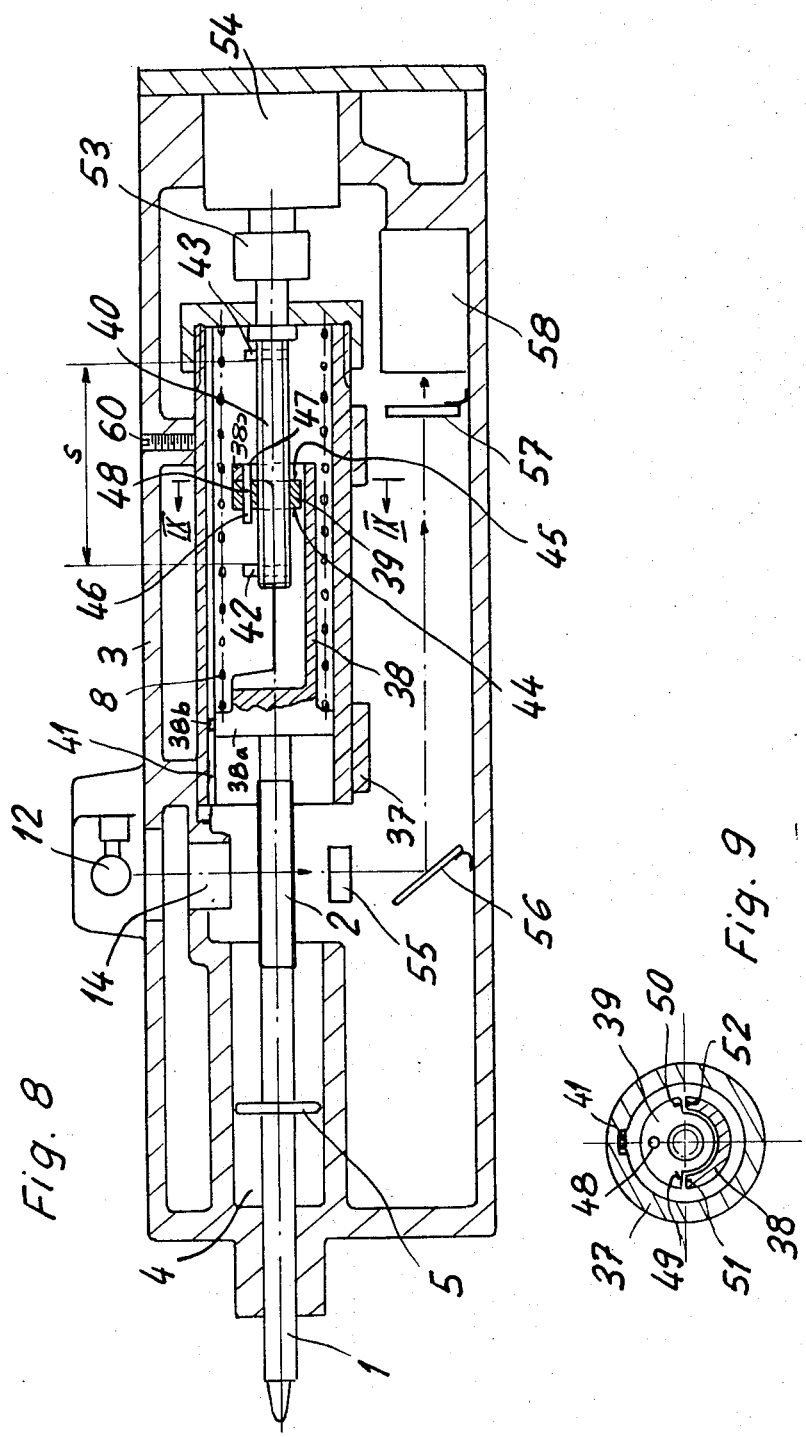

LENGTH GAUGING APPARATUS

The present invention concerns a length gauging apparatus with a gauge pin displaceable in its longitudinal direction and a scale or frame connected directly or indirectly thereto.

Length gauging devices with thread or gear-wheel transmissions housed between the gauge pin and the scale carrier are already known, but these have the disadvantage that the displacement of the gauge pin over a relatively large gauging range is relatively irksome and the whole transmission mechanism represents a considerable source of error.

If the gauge pin is connected directly or via a lever system with a scale and the gauge values are taken as a magnified copy in an optical manner then resilient means, which move the gauge pin in the direction of measurement, must be provided. If the operator carelessly allows the gauge pin to spring from a retracted position under the influence of the resilient means and to fall on to a measuring surface then the tip of the gauge pin can penetrate the surface of the material which is to be measured, and in the case of precision measurement apparatuses with which it is desired to measure for example a thousandth part of a millimetre, this leads to measurement errors. Furthermore, such blows acting on the gauge pin lead, at least when occurring fairly regularly, to damage of the measurement system linked with the gauge pin. If the gauge pin is connected with a cushioning arrangement, via a transmission system which is attached even with only a small play, e.g., via a lever transmission system housed between the gauge scale and the gauge pin, then a blow influencing the tip of the gauge pin will notwithstanding be transmitted with its initial momentum uncushioned on to the gauge system which is connected in movable manner with the gauge pin. Tests have shown that such an arrangement of the cushioning apparatus is unable to provide satisfactory results in the case of high precision gauge instruments over a period.

An aim of the invention is to provide a length gauging apparatus in which the disadvantage referred to above does not occur.

The length gauging apparatus according to the invention is characterized in that the gauge pin is provided with a cushioning arrangement which prevents the gauge pin from exceeding a set speed of displacement when it is displaced.

It is expedient that the gauge pin is fitted with a piston displaceable inside a cushioning cylinder, and that the longitudinal axis of the piston and that of the cushioning cylinder coincide and run parallel to the longitudinal axis of the gauge pin.

It is expedient that the gauge pin is connected with a scale or a frame grid extending in its longitudinal direction and embodied so as to be non-rotatable, and that resilient means are fitted which press directly or indirectly in the direction of measurement on to the gauge pin.

If it is desired to achieve the greatest accuracy then it is expedient if the gauge pin and the scale or screen are arranged in a line.

If the scale or frame is to be adapted to be displaced via a spindle, then it is expedient if the scale or frame is connected at the end facing away from the gauge pin with a guide member which is embodied so as to be non-rotatable and in a straight line along its path of displacement and a spindle secured against rotation but longitudinally displaceable and provided with a sleeve which cooperates with the guide member is fitted, in such a way that when the guide member is displaced by the sleeve, against the influence of the resilient means, the sleeve lies up against the guide member, but when the sleeve is displaced in the opposite direction the latter ceases to engage with the guide member if the gauge pin, e.g., as the result of being placed against a measurement surface, is prevented from moving further and the spindle is nevertheless further rotated. In this case it is expedient if the spindle is fitted at both ends of its thrust path with an end stop and the sleeve is fitted at its two facing surfaces with an abutment surface co-operating in the peripheral direction with one each of the end stops.

If the scale or frame together with the gauge pin is adapted to be adjustable directly by means of movement in a straight line starting from the outside of the gauge device housing, then it is expedient if the scale or frame is fitted, with a view to displacement of the gauge pin, with a tension bolt which projects from out of the gauge apparatus housing, whose longitudinal axis runs parallel to that of the gauge pin.

Figure 2:
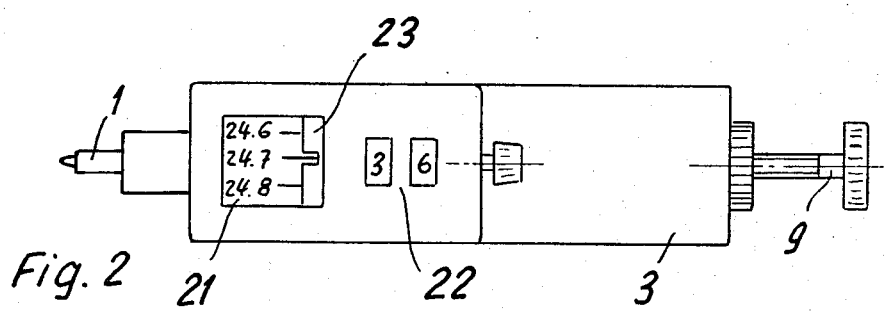
Figure 3:
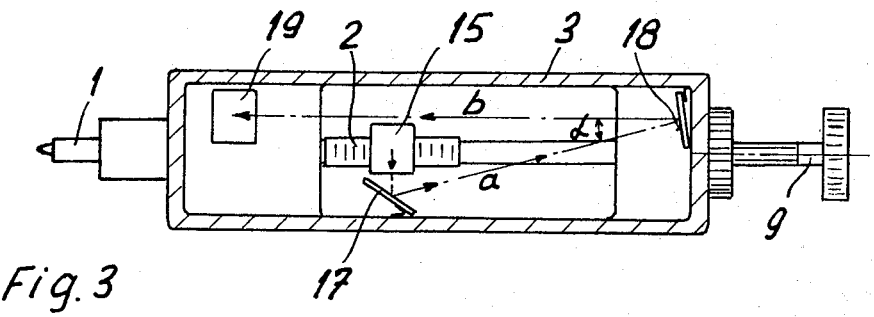
Figure 5:
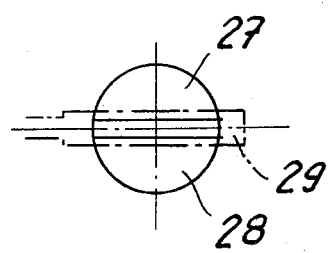
Figure 4:
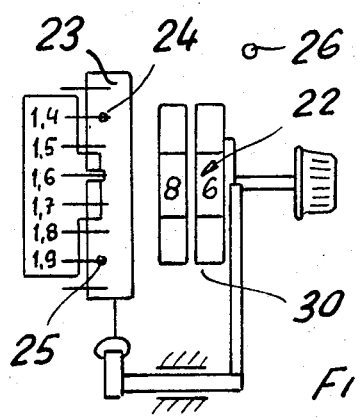
Figure 6:
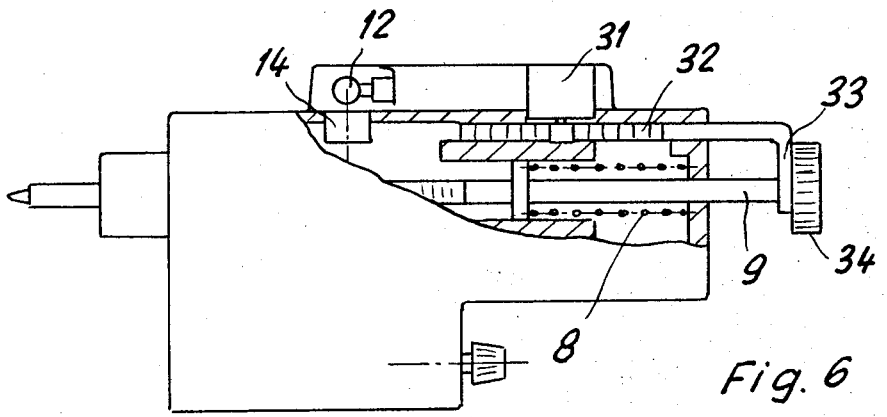
Figure 7:
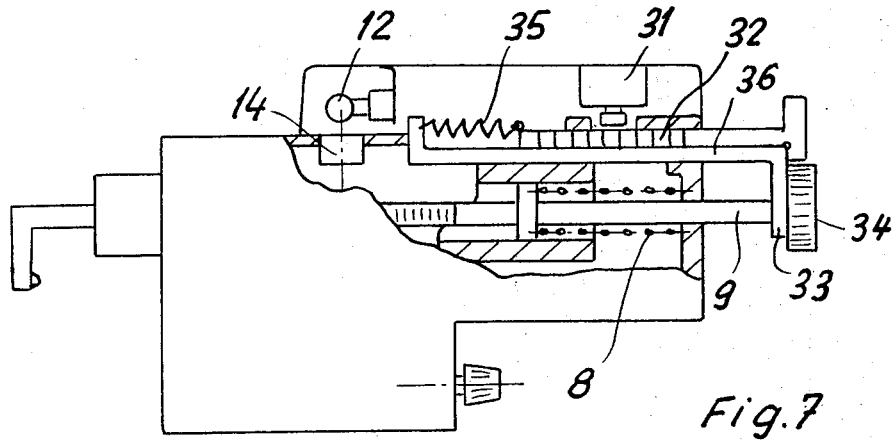

The invention will be further explained below with reference to the drawings by way of example. These show:

FIG. 1 a longitudinal section through a first embodiment given by way of example only of a length gauging apparatus according to the invention;

FIG. 2 a view in the direction of the arrow A in FIG. 1;

FIG. 3 a section along line III—III in FIG. 1 in order to show the optical beam path;

FIG. 4 a further embodiment of the invention using a vernier in the case of photo-electric bracketing of the measurement value;

FIG. 5 a photocell for bracketing the measured value on an enlarged scale;

FIG. 6 a view of a length gauging apparatus similar to that of FIGS. 1 to 3, but with an adjustable displacement of the gauge pin by means of a reversible motor;

FIG. 7 a view analogous to FIG. 6, but with an apparatus for changing the direction of measurement;

FIG. 8 a longitudinal section through a yet further embodiment given by way of example only of a length gauging apparatus according to the invention; and FIG. 9 a section along line IX—IX in FIG. 8.

The length gauging apparatus shown in FIGS. 1 to 3 displays a gauge pin 1 displaceable in its longitudinal direction and a scale 2 directly connected thereto. The gauge pin 1 is fitted with a displaceably embodied piston 5 inside a cushioning cylinder 4 formed in the gauging apparatus housing 3, the longitudinal axis of the piston 5 and that of the cushioning cylinder 4 coinciding and running parallel to the longitudinal axis of the gauge pin 1. The gauge pin 1 is connected to a scale 2 extending in its longitudinal direction, the latter being guided in non-rotatable manner by a guide pin 7 connected thereto, extending into a guide groove 6 running parallel to its direction of displacement. In order to displace the gauge pin 1 connected with the scale 2 against the force exercised by the springs 8 in the measurement direction on the scale 2 the scale 2 is fitted with a tension bolt 9 projecting from out of the gauging apparatus housing 3, whose longitudinal axis runs parallel to that of the gauge pin 1. The tension bolt 9 is further fitted with a thread 10 and an adjusting nut 11 screwed on to this thread 10 outside the gauging apparatus housing 3 with a view to limiting the range of displacement of the gauge pin 1 in the direction of measurement. This adjusting nut 11 is particularly advantageous if fairly large series of the same parts are to be measured, in which the same measurement range is never required, i.e., in which the gauge pin 1 never has to be displaced into its extreme position.

In order to avoid as far as possible heating of the parts which are important with a view to accuracy of measurement, the lamp 12 for illumination of the scale 2 is housed outside the actual gauge apparatus housing 3 under a cover 13 which is fitted with ventilation slots. A condenser lens 14 is located between the lamp 12 and the scale 2 and an objective 16 between the scale 2 and the first deflection mirror 15.

So as to keep the shape of the length gauge apparatus as compact as possible, the optical beam path, as can be seen from FIGS. 1 and 3, is deflected or: The optical beam path according to the scale is.....deflected after the scale 2 via the two mirrors 15 and 17 into a first direction a, running at least approximately in the direction of the gauge pin axis, then via the deflection mirror 18 into a direction b opposite to the first direction a under an acute angle α, and finally via the mirror 19 into a direction c running vertical to the gauge pin axis. The optical deflection system comprising the mirrors 15,17,18 and 19 is so arranged that when the scale graduations 20 run vertical to the direction of displacement of the scale 2, the scale which is reproduced on the ground glass plate 21, as can be seen from FIG. 2, is moved, in the event of displacement of the gauge pin 1, perpendicular to the latter's longitudinal axis, this being very advantageous with a view to reading off and also arranging a vertically (perpendicularly) indicating vernier.

As a linear scale is projected on to the ground glass plate 21, this scale can have a precisely measuring vernier 22 associated with it. So as to facilitate exact setting of the slide bar 23 of the vernier 22, as can be seen from FIG. 4, the slide bar 23 is fitted with two photocells 24 and 25, which give an optical display via a display lamp 26, when the slide bar 23 is directly matching the division which is to be bracketed of the measurement scale which is projected on to the ground glass plate 21, i.e., when the division is found exactly in the centre of the bracketing. In this way the operator no longer needs to concentrate so much when bracketing the measured values, i.e., does not become so tired so quickly, and the reading becomes even more accurate.

It is of course also possible to provide only one photocell for bracketing the measurement value by means of the vernier 22. In this case the photocell can, as is seen in FIG. 5, be subdivided into two halves 27 and 28 and so connected with a display apparatus that when the dotted division 29 is uniformly projected on to both halves 27 and 28, an extreme value is displayed.

When the slide bar 23 is embodied in such a way it is expedient if the vernier is designed with a digital display device 30 to avoid further reading errors.

It is of course also possible to provide a frame instead of the measurement scale 2, which co-operates with a counter-frame and photo-electric evaluation means for providing electronic and digital display of the measurement value.

The length gauging apparatus described above is very compact in construction, easy to read because of the 90° optical rotation and approximate 40-fold magnification of the scale which is to be projected, and very quickly and easily serviced even in the event of measurement values deviating in a marked manner from each other. Furthermore the surface/contact pressure of the gauge pin 1 lies within accurately known narrow limits.

The apparatus can of course be fitted also with a measurement loop, as is shown by the dotted line in FIG. 1.

FIG. 6 represents a view of a length gauging apparatus similar to that of FIGS. 1 to 3 in which a reversible motor 31 can be fitted when required to effect displacement of the gauge pin. The motor 31 operates in this case via a gear rack 32 which engages at its front end via a fork-shaped member 33 with the retaining button 34 of the tension bolt 9.

If the length gauging apparatus shown in FIG. 6 is used for measurement in two opposite measurement directions then, as can be seen from FIG. 7, it is possible to assign a second lever 36 to the gear rack 32, this being connected to the gear rcak 32 via a tension spring 35, whose tensile force is double that of the pressure spring 8. If the gear rack 32 is moved to the right by means of the motor 31 in FIG. 7, then the gear rack 32 pulls the lever 36 via the spring 35 and thus the tension bolt 9 to the right. When the measurement scanner is abutting against a measurement surface half the tensile force of the spring 35 comes into effect, i.e., the measurement force is exactly the same size as when measuring to the left and similarly of known size. The motor 31 can be designed for example like the starting motor of an internal combustion engine, so that the bevel gear engages with the gear rack 32 only when the motor 31 is switched on, and thus facilitates manual activation.

FIG. 8 shows a longitudinal section through a further embodiment of the invention given by way of example. In this embodiment the frame (scale 2) is connected at the end remote from the gauge pin 1 to a cylindrical portion 38a of a guide member 38 which is guided in a straight line along its path of displacement and in non-rotatable manner in a guiding tube 37 by means of a guide pin 38b which runs in a longitudinal groove 41 in the guiding tube 37, and there is also provided a spindle 40 which is fitted with a sleeve 39, secured against rotation, but adapted to be displaced longitudinally and co-operating with the guide member 38. The design is such that when the guide member 38 is displaced to the right in FIG. 8 by the sleeve 39, i.e., against the influence of the spring 8, the sleeve 39 comes to lie against a stop 38c at the end of the guide member 38, out when the sleeve is displaced in the opposite direction to the left the sleeve 39 is no longer engaged with the guide member 38, if for example the gauge pin 1 lies against a measurement surface and the spindle 40 is nevertheless further rotated. The guiding tube 37 together with the guiding member 38 mounted therein for displacement in a longitudinal direction, but which is maintained non-rotatable with respect to the guiding tube 37 by reason of the groove 41 and pin 38b sliding connection, is arranged for rotational adjustment in the housing 3 in order to enable the frame (scale 2) which is fixed to the guide member 38 to be accurately positioned with respect to the optical system (lens 14, lamp 12, objective 55, mirror 56, reverse frame 57 and photo-electric means 58 located in the housing 3). After the frame 2 is accurately positioned, the guiding tube 37 is clamped fast relative to the gauging apparatus housing 3 by means of a set screw 60. This arrangement facilitates a very accurate and rapid positioning of the frame 2 or of a scale and further has the advantage that the same gauging apparatus housing 3 can be used for frames 2 which vary in length, a correspondingly shorter or longer guiding tube 37 being used when mounting.

The spindle 40 which rotates within guide tube 37 is fitted at both ends of its thrust path $s$ with an end stop 42 or 43 and the sleeve 39 is fitted at both its facing surfaces 44 and 45 with abutment surfaces 46 and 47, each one in a peripheral direction, and each corresponding to one of the end stops 42 or 43. The abutment surfaces 46 and 47 of the sleeve 39 are formed by a stop/trip pin 48 which runs axially and is housed in the sleeve.

The length of the stop/trip pin 48 is so chosen that the end stop 42 or 43 can be moved past directly in front of the end of the thrust path $s$ exactly at the end of the stop/trip pin 48, so that it then lies against the side of the latter. By this means the axially-directed forces at the end of the thrust path $s$ are prevented from influencing the frame scale 2 and the gauge pin 1 and thus having a disadvantageous influence on the measurement results.

The guide member 38 has, as can be seen from FIG. 9, when seen in cross-section, the shape of a circular ring sector and the sleeve 39 is fitted with stop surfaces 49 and 50 which extend in the radial direction over the inner diameter of the circular ring section and cooperate with the latter's axially running guide surfaces 51 and 52 in such a way that when the spindle is rotated the sleeve 39 is not rotated along its total displacement path relative to the guide member 38.

At its rear end the spindle 40 is connected via a coupling member 53 to a reversible drive motor 54.

The part of the frame (grid) 2 which is reproduced by an objective 55 is reproduced with the help of a deflecting mirror 56 with approximately 10-fold magnification on to a reverse frame (grid) 57, behind which photo-electric means 58 are housed in order to determine the measurement value by digital means.

The gauge pin 1 can of course also have a divided scale connected to it instead of the frame 2.

What I claim is:

1. In a gauge structure for measuring length, the combination comprising a housing, a gauge pin mounted in said housing for displacement in a longitudinal direction, means for damping displacement of said gauge pin in the measuring direction, said damping means including a cushioning cylinder within said housing and a damping piston secured to said gauge pin for operation within said cylinder, a scale component secured to said gauge pin within said housing, an optical system located within said housing for viewing said scale and transmitting the indication thereon to readout means, a guide member secured to said gauge pin for guiding said pin and said scale in its longitudinal direction of displacement, a guide tube extending coaxially with said gauge pin, means mounting said guide member within said guide tube for longitudinal but non-rotative displacement relative thereto, said guide tube and hence also said guide member being rotationally adjustable about its axis thereby to provide for a precise alignment of said scale relative to said optical viewing system therefor, spring means cooperative with and biasing said guide member for displacement thereof and hence also said gauge pin and scale in the measuring direction, and means for actuating said guide member in the opposite direction against a counter force exerted by said spring means.

2. Apparatus as defined in claim 1 wherein said means for actuating said guide member in the opposite direction against a counter force exerted by said spring means comprises a threaded spindle, means for rotating said spindle, a sleeve mounted on said spindle and which is guided for a longitudinal but non-rotational displacement as said spindle is rotated, and means coupling said sleeve with said guide member such that when said guide member is displaced by said sleeve against a counter force exerted by said spring means by rotation of said spindle in one direction said sleeve lies against said guide member, said sleeve being disengaged, however, from said guide member when said gauge pin is stopped by the measurement surface and said spindle continues to rotate in the opposite direction.

3. Apparatus as defined in claim 2 wherein said threaded spindle is provided with longitudinally spaced end stops defining its limits of travel, and said sleeve which is mounted on the spindle is provided with corresponding stop surfaces cooperative respectively with the end stops on said spindle.

4. Apparatus as defined in claim 3 wherein the stop surfaces on said sleeve are formed by at least one axially extending stop/trip pin.

5. Apparatus as defined in claim 2 wherein said guide member has the configuration of a circular ring sector and said sleeve is provided with stop surfaces extending radially over the internal diameter of the circular ring sector and cooperate with the latter's axially running guide surfaces such that when said spindle is rotated the sleeve will remain non-rotative along its total displacement path relative to said guide member.

6. Apparatus as defined in claim 2 and which includes a reversible electric motor for rotating said threaded spindle in one direction or the other.

* * * * *